July 13, 1954

C. M. GREEN, JR  
METHOD AND APPARATUS FOR PRODUCING LAMINATED SHEETS OF ICE, INCLUDING AUTOMATIC CONTROLLED CYCLING MEANS 2,683,356

Filed Nov. 10, 1952

INVENTOR  
CHARLES M. GREEN, JR.

BY *Mason, Mason & Sheridan*

ATTORNEYS

July 13, 1954

C. M. GREEN, JR 2,683,356

METHOD AND APPARATUS FOR PRODUCING LAMINATED
SHEETS OF ICE, INCLUDING AUTOMATIC
CONTROLLED CYCLING MEANS

Filed Nov. 10, 1952

INVENTOR
CHARLES M. GREEN, JR.

BY Mason, Mason & Shueder

ATTORNEYS

FIG. 8.

INVENTOR
CHARLES M. GREEN, JR.

Patented July 13, 1954

2,683,356

UNITED STATES PATENT OFFICE 2,683,356

METHOD AND APPARATUS FOR PRODUCING LAMINATED SHEETS OF ICE, INCLUDING AUTOMATIC CONTROLLED CYCLING MEANS

Charles M. Green, Jr., Pensacola, Fla., assignor to Francis Wm. Taylor, Pensacola, Fla.

Application November 10, 1952, Serial No. 319,696

22 Claims. (Cl. 62—106)

This invention relates primarily to a method and apparatus for producing laminated sheets of ice and is a continuation-in-part and improvement over my prior application Serial No. 181,439, filed August 25, 1950, and entitled "Ice Making Method and Apparatus," reference to which is hereby made to the extent that a better understanding of the present invention may be had. The term "ice" as used herein refers primarily to frozen water but is meant to include congealed liquids and material in general, such as fruit juices and other liquids containing flavoring and chemicals, these being more clearly enumerated in application Serial No. 181,439.

In the past several methods and apparatus for manufacturing ice, such as shown and described in the Field Patents Nos. 2,546,082, 1,482,227 and 1,480,382, have enjoyed considerable commercial success. However, difficulty has been encountered in attempting to produce efficiently, quickly and at low cost a piece or block of ice composed of a plurality of laminated sheets of ice that, in their entirety, are of various sizes and shapes, and there exists an increasing demand for a block or piece of ice composed of laminated sheets. The present invention is believed to provide the method and apparatus to satisfy this demand, and has for its general objective, like that of my prior application Serial No. 181,439, the continuous, automatic, low-cost production of ice congealed against flexible refrigerated plates or surfaces accessible to the liquid from which the ice is to be made. However, instead of merely producing on said refrigerated surfaces a single sheet of ice, a plurality of laminated sheets of ice of a more or less uniform thickness are built up on the surface by the instant method and apparatus.

Therefore, the primary object of this invention is the provision of a novel method and apparatus for producing in large quantity at low cost and with reasonable speed a block or piece of ice composed of a plurality of built-up, laminated sheets of ice that are nested, congealed and bonded together.

Another object is to provide a method and apparatus for efficiently and quickly producing a large amount of ice in the form of an ice block having a plurality of laminations, and conveying said formed ice to storage means.

A further object of this invention is in the provision of a method of producing a block of ice composed of laminated sheets, comprising the steps of freezing a sheet of ice on a flexible refrigerated surface, flexing said surface convexly to partially free said sheet from said surface whereby liquid enters the area between the surface and sheet, freezing the newly entered liquid to the previously formed sheet and the surface, flexing the surface concavely to partially release the built-up sheet, and continuing said flexing alternately convexly and concavely until a laminated sheet or plate is produced.

Still another object of this invention is to produce a laminated block of ice by applying to a flexible refrigerated surface an amount of liquid, freezing said liquid into a sheet, partially releasing said sheet from said surface by flexing either concavely or convexly the surface, applying additional liquid in the area between the freed part of the sheet and the refrigerated surface, freezing said additional liquid to said sheet and surface whereby a sheet of irregular thickness composed of two laminated pieces is formed, continuing said flexing action until the desired thickness of the block is achieved, and releasing said block from said surface and conveying same to storage.

A still further object of this invention is in the provision of a method and apparatus for producing a block of ice comprising laminated sheets by alternately flexing concavely and convexly flexible refrigerated surfaces and means including timer control means for automatically controlling the flexing cycle of one or more refrigerated surfaces.

Broadly speaking, my invention is predicated upon the elastic limit of a single sheet and laminated sheets of ice on a refrigerated surface upon alternately flexing convexly and concavely, or vice versa, said surface by creating variations in the internal and external pressures against said surface. Upon flexing the refrigerated surface a regulated amount, after a first film of ice solidifies thereon, a portion of said film will be released from said surface although said film remains in one piece. Liquid is then permitted to enter into the space between the film and surface whereupon refrigeration or congealing of said liquid is immediately effected to partially build up said film. Thereafter, upon flexing in the opposite direction, accomplished by changing the pressures, another or the same section of the film is freed from the surface and liquid enters the space and is congealed to form a film of three laminations at one section or two laminations at two sections of the film depending upon which area of the film was freed from the refrigerated surface. In this manner, the film is built up upon said refrigerated surface until it composes a plurality of laminations and becomes of such thickness that the effect of flexing the surface exceeds the ultimate strength of the built-up film at which time the film in whole or in part, usually the whole, will fracture and be separated from the refrigerated surface. The alternate flexing of the refrigerated surface is controlled, preferably, automatically in timed sequence.

The ice sheet or block formed prior to separation from the refrigerated surface will not be of uniform thickness over the entire area, but instead will comprise laminations of various size and shape, this phenomenon being due to the fact that the ice film on some areas of the refrigerated surface will not separate from the surface as frequently or as far as it does on other parts of the surface. Accordingly, the several laminae composing each portion of each sheet of ice will be of different thicknesses averaging, however, approximately one-eighth of an inch thick.

According to one embodiment of this invention, an insulated tank is filled with water or other liquid adapted to be congealed, and a number of evaporator units are inserted in the tank with the liquid surrounding the units, and at the top of the tank there is provided harvesting means comprising a conveyor. Each unit may comprise two flexible refrigerated surfaces secured to a resilient body, and the interior sides of the refrigerated surfaces are insulated from each other whereby a gas or liquid pressure may be supplied against the interior side of each surface. In other words, pressure compartments divide the interior sides of each surface. Upon passing refrigerant through a refrigerated surface, a sheet of ice is formed on the exterior side of the refrigerated surface and thereafter pressure is applied to the interior side of the surface in an amount sufficient to overcome the pressure of the liquid in the tank, the external pressure, and cause flexing of the surface convexly. This, in turn, permits part of the sheet of ice formed to be partially released from the surface and water immediately enters the area between the freed part of the sheet and the refrigerated surface and is in contact with the refrigerated surface and thereby congealed thereto together with the sheet to provide a built-up sheet or film. Following this, a vacuum is created in the compartment by removing a pressure and the surface is permitted to flex concavely, due to the pressure of the liquid in the tank, or in the opposite direction to the first flexing and, in a similar manner, another part or the same part of the built-up film is freed from the surface and an additional amount of liquid which enters the freed area is congealed to further build up the film in the form of a lamination. This operation of flexing first convexly and then concavely, or vice versa, is continued until, when the elasticity strength is exceeded by the effect of flexing, the entire laminated sheet formed is separated from the refrigerated surface, although during the entire operation some of the ice formed will break away prior to complete release. The pieces of ice, when freed from the refrigerated surface, float to the top of the liquid in the tank and are conveyed to storage means.

Another embodiment of my invention incorporates the same principles of the first embodiment, namely of having an insulated tank with evaporator units supported therein. However, instead of having a supply of liquid contained in the tank, a regulated amount of liquid is supplied to the units directly over same. In other words, when a sheet of ice is partially freed from the surface, liquid is supplied, under valved control, from a header member to the freed area, and this operation is continued until the complete sheet breaks away, at which time it falls to the bottom of the tank and passes through a delivery chute to ice storage means. In this modification, a water trap is provided to maintain the delivery chute substantially dry, and at the base of the tank, water storage means which connects with the water trap and the header means is provided and controlled by conventional float-control-motor pump means.

Referring to the drawings wherein like numerals represent identical elements throughout.

Figures 1, 2, 3:
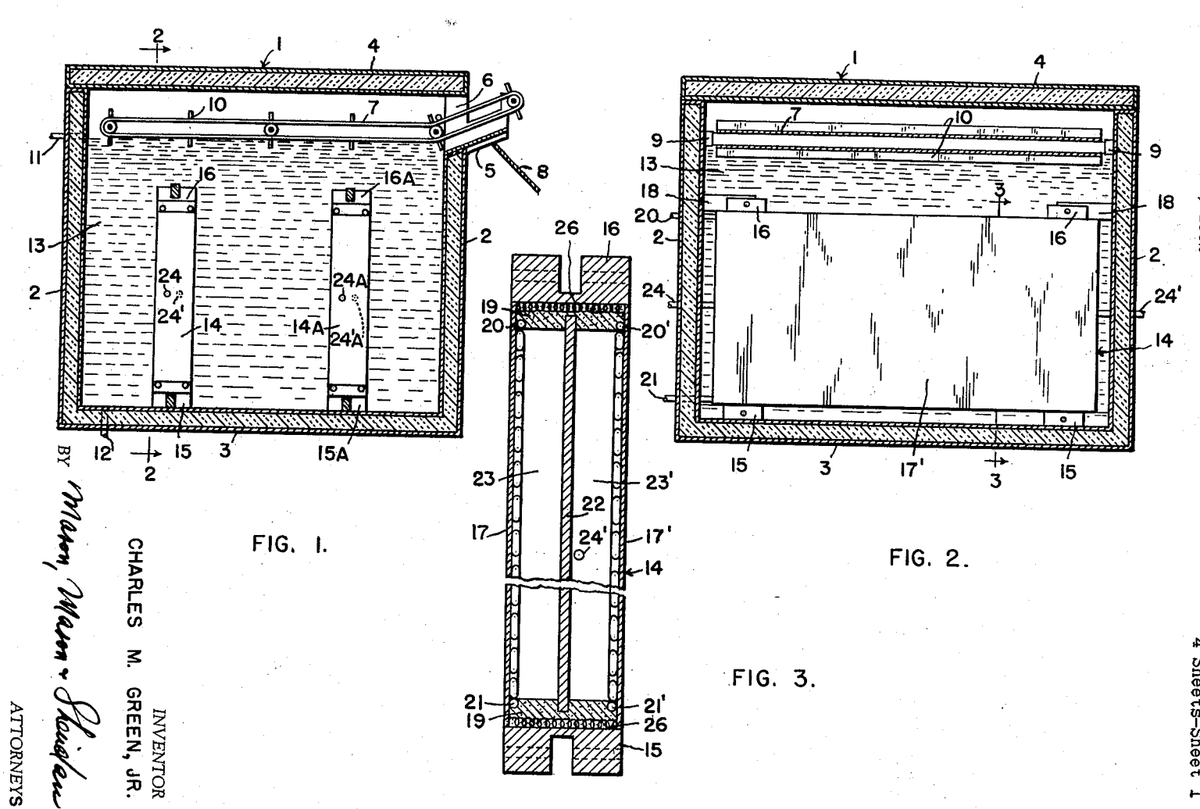
Figure 1 is a sectional view of one embodiment of this invention showing a tank having two refrigerated units contained therein.
Figure 2 is a sectional view taken along the line 2—2 of Figure 1.
Figure 3 is an enlarged sectional view taken along the line 3—3 of Figure 2.

Referring more particularly to the form of my invention shown in Figure 1, numeral 1 represents an insulated tank having a bottom wall 3, side walls 2 and a top wall 4. On one of the side walls there is provided a protruding flange 5 and an opening 6 through which part of a conveyor means 7 extends. Secured to the flange 5 by any suitable means is a delivery chute 8, which directs the ice formed to storage means, not shown. The conveyor means 7 having blades or teeth 10 extends across substantially the width of the tank and is supported by any suitable means, such as shown at 9 in Figure 2. This conveyor means may be of any conventional type well known in the art so long as it functions to convey or harvest the ice formed.

The interior of the tank 1 is maintained at a certain level with water or other liquid 13 adapted to be congealed, the inlet and outlet for the liquid being shown at 11 and 12, respectively. Any desired means may be utilized for maintaining the liquid at a level whereby the teeth 10 of the conveyor 7 will always be in a position to engage the ice which floats to the top of the liquid. For example, conventional float-control means to regulate the inlet through 11 and outlet through 12 may be utilized.

Referring to Figures 2 and 3, and more particularly to Figure 3 there is shown an evaporator unit 14. Any number of these units may be provided in the tank 1, but for illustration purposes two, 14 and 14A are shown. Each unit comprises mounting supports 15 and 16, supports 16 being fastened to the side walls of the tank by any suitable means 18 and supports 15 being secured to the bottom wall of the tank by any suitable means.

Each unit 14, unit 14A being the same, has a pair of flexible refrigerated plates 17 and 17' secured to resilient support means 19 which, in turn, are fastened by suitable means to mounting supports 15 and 16. Any type of refrigerated or freezing plate may be used providing it is flexible and it is preferred that the outside or exterior surface of each plate be smooth. As shown, the refrigerated plates 17 and 17' each comprise an outside smooth refrigerated surface and an interior surface to which refrigerated coils are connected, each plate being mounted to support 19 in such a manner that it may flex concavely and convexly. Each evaporator unit 14 is shown as having two refrigerated plates but it is to be understood that a unit with one plate or more than two come within the scope of the invention. Plates 17 and 17' are divided from one another to form two pressure-tight spaces by means of rigid dividing plate 22, which also is secured to supports 19 at the top and bottom thereof by any suitable means. Numeral 23 represents one pressure-tight space, or compartment, and numeral 23' represents another pressure-tight compartment, and any type of pressure gas or liquid may be supplied to or evacuated from these spaces through conduits 24 and 24'. Hereinafter will be described an automatic cycling system but it is to be understood that the supply and evacuation of gas or liquid pressure may be accomplished by the use of a vacuumizing pump or other means that is continually operated at such a speed as to cause a pressure varying action to be produced at certain intervals. Liquid refrigerant is supplied at inlets 21 and 21', and each of the refrigerated coils embedded in the plates 17 and 17' has an outlet as shown at 20 and 20'. The refrigerant inlet and outlet means of each plate 17 and 17' are connected to a common inlet and outlet whereby by any conventional pump means or other suitable means, circulation of refrigerant or refrigerating medium through the coils is maintained. Vaporizable refrigerants as in a compression system may be employed or the refrigerant may be brine.

Numeral 26 represents heating coils embedded in the resilient supports 19, and the purpose of this coil is to prevent ice forming on the edges of the refrigerated plates 17 and 17'. Instead of heating coils, any equivalent means may be embedded in the supports 19.

As previously mentioned, evaporator unit 14 and 14A illustrate the preferred type but it is clear that only one refrigerated surface 17 and one pressure compartment 23 is required or, on the other hand, each unit may comprise additional refrigerated plates and pressure compartments.

Figure 4:
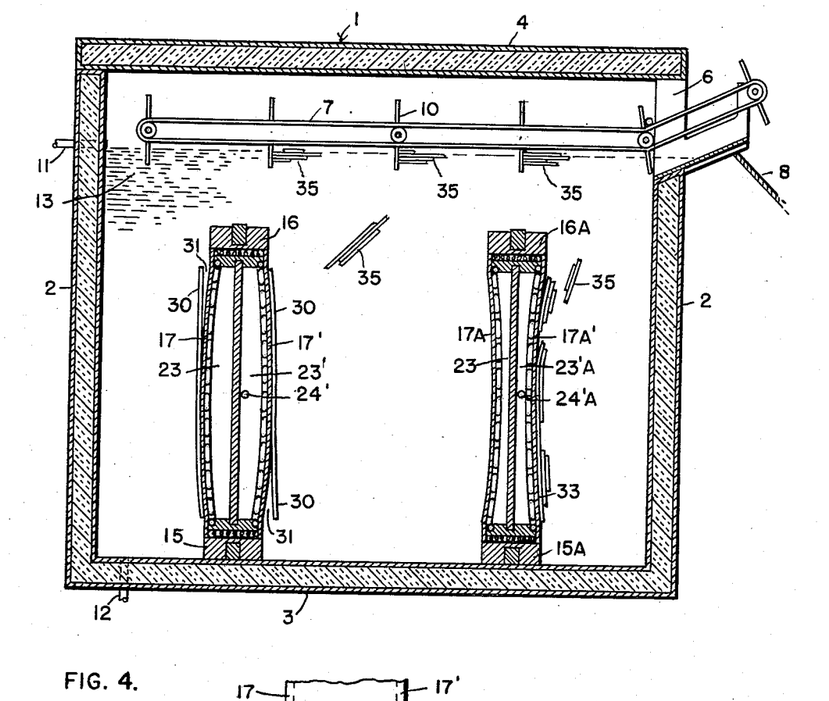
Figure 4 is also an enlarged sectional view of the modification shown in Figure 1, emphasizing the operation thereof at different stages of the ice-forming.

Referring to Figure 4 of the drawings, which is a view similar to the one shown in Figure 1, there is shown a sheet of ice 30 formed on each surface of the refrigerated plates 17 and 17', but it is to be noted that part of each sheet 30 is freed from its refrigerated surface, as shown at 31. The position of sheets 30 was brought about by increasing the internal pressure within spaces 23 and 23' to overcome the external pressure created by the liquid 13 on the exterior surfaces of 17—17'. When this occurs, each of the plates 17 and 17' and its coil is forced to flex convexly or is bowed or deformed outwardly in an amount equivalent to the difference in pressure within the spaces 23 and 23' and the external pressure. During this flexing, part of each sheet 30 is freed from the refrigerated surfaces, as shown. When this happens liquid within the tank immediately enters areas 31 and ice is congealed within this area against sheets 30 and plates 17 and 17'. Next, pressure is removed from spaces 23 and 23' until the exterior pressure caused by the liquid in the tank exceeds the pressure within the spaces, whereupon a concave flexing or bowing or deforming inwardly of the plates 17, 17' occurs. This type of flexing continues, and by alternately convexing and concaving plates 17, 17' ice sheets will be built up on the refrigerated surfaces into laminations as shown at 33 in connection with unit 14A. However, these ice sheets will not be of uniform thickness over their entire area, this phenomenon being due to the fact that ice on some areas of the plates will not separate from the plates as frequently or as far as it does on other parts of the plates. A representative formation is shown at 33, and it can be seen that some of the laminated pieces, such as at 35, break off from time to time and float to the top of the liquid 13, whereupon they are conveyed by conveyor means 7. As illustrated, the plates 17, 17', 17A and 17'A, flex convexly and then concavely. However, it should be clear that plate 17 may be arranged to flex convexly while plate 17' is flexed concavely or vice versa by merely regulating the pressure in the compartments. In other words, each refrigerated surface is deformed or bowed outwardly and inwardly by variation of the liquid or gas pressure.

During the building up or congealing of formation 33, some formations, as stated before, such as shown at 35, break off or fracture from the major portion of the film which retains its adherence to a refrigerated surface. At some time, for example, when the formation reaches the status shown in Figure 7 and generally represented by numeral 36, the ultimate strength of the formation will be exceeded by the effect of the flexing action and the formation will be separated, usually in whole or in divided section, from the surface. Such formation or formations of sections will float to the top of the liquid 13 and, as shown at 37, will be harvested or conveyed to storage means.

Specific operation of the first embodiment, referring only to one unit, of my invention is as follows: The tank 1 is filled with drinking water, and seawater may be used containing approximately three per cent of salts or other liquid adapted to be congealed. The level of this liquid in the tank is maintained constant at all times as previously explained. Any suitable liquid refrigerant, such as methyl chloride, Freon, or other refrigerating medium is circulated through the coils in refrigerated plates 17 and 17', the outlet and inlet means 20, 20' and 21, 21' serving as part of the circulating system. When a refrigerant having a temperature of approximately —30° to —40° F. is admitted to the coils of the refrigerant plates, there occurs substantially instantaneously against the exterior surface of each refrigerated plate 17 and 17' a formation in the form of a film of ice covering the entire surfaces except at the edges due to the heating means 26. Referring to Figure 4, these sheets or films, are shown at 30. After the films have become sufficiently thick to resist bending, say 1/4 to 1/2 inch thick, gas or liquid pressure is supplied through conduits 24, 24' to compartments 23, 23' at a pressure of approximately five to eight pounds p. s. i. Conduits 24, 24' are arranged in a circuit with a pressure or exhaust pump whereby the gas or liquid in chambers 23, 23' may be placed under pressure to deform plates 17, 17' outwardly or the liquid or gas pressure may be withdrawn to form a partial vacuum to cause the plates to be deformed inwardly under the pressure of the liquid 13 in the tank. Supplying or withdrawing of the gas or liquid pressure may be done by the automatic means hereinafter described in detail or by other means such as manually operated pump and valve means to control the supply or evacuation of valve means connected with a timing device to adjust the position thereof.

Applying sufficient pressure within the compartments 23, 23' distorts convexly both plates 17, 17' to such an extent that the ice films 30 are freed from the refrigerated surfaces over a fairly large part but not all of the area of the surfaces, as shown in Figure 4, the distance 31 between the freed areas of the films 30 and the refrigerated surfaces varying but averaging approximately $\frac{1}{8}$ to $\frac{5}{16}$ of an inch. Immediately thereafter, water 13 rushes into area 31 and quickly congeals to the refrigerated surfaces and to films 30. The operation of ice forming on each plate 17, 17' is the same so explanation will be continued only in connection with plate 17.

After the most recently formed ice, that in area 31, has been frozen solid, say 0° to 10° F., pressure is removed from compartment 23 until the exterior pressure of liquid 13 deforms plate 17 concavely. In actual practice, a vacuum of approximately 5 to 25 inches is created in compartment 23. By this concave deformation of surface 17 the previously built-up ice sheet will be separated from surface 17 over part of the area and again liquid will rush into the separated space and congeal. Thus, the ice formation is thickened by the lamination formed in the separated space. The above cycle is repeated and by alternately convexing and concaving plate 17 and holding said plate stationary, ice sheets 36 will be quickly built up by laminations formed in the separated space. The above cycle is repeated and by alternately convexing and concaving plate 17 and holding said plate stationary for a time interval, ice sheets 36 will be quickly built up by laminations formed adjacent the surface 17.

Figure 5:
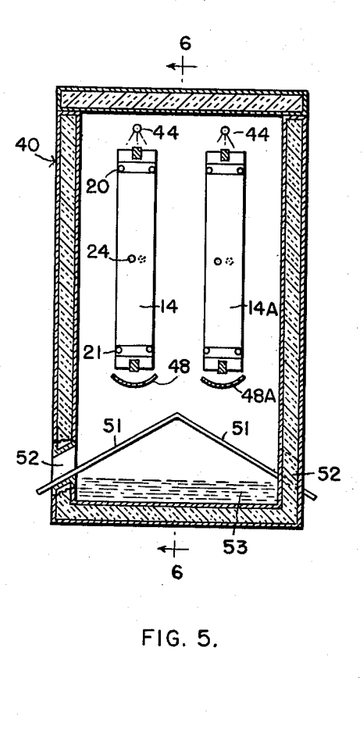
Figure 5 is a sectional view of a second embodiment of my invention showing two refrigerated units within a tank.
Figure 6:
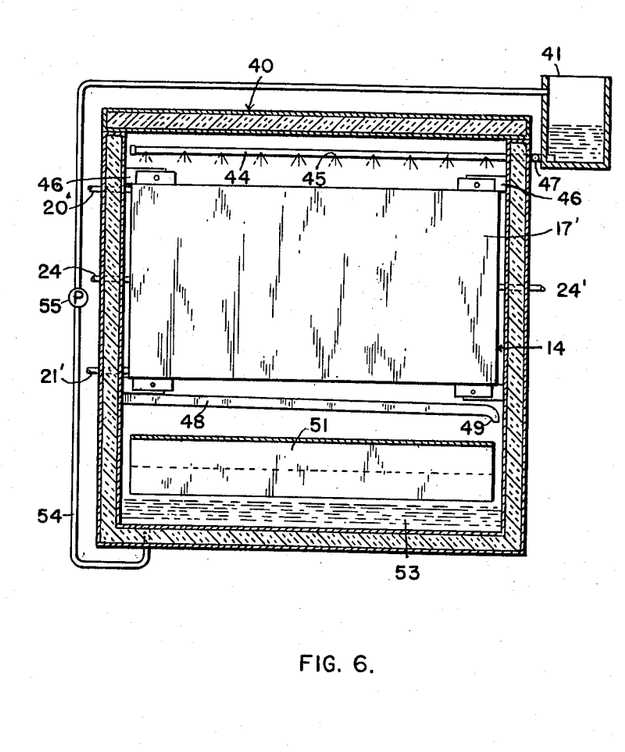
Figure 6 is a sectional view taken along the line 6—6 of Figure 5.

Referring to the second embodiment of this invention, namely, the one shown in Figures 5 and 6, numeral 40 represents an insulated tank having top, bottom and side walls. Within the tank are any number of units 14, similar to the ones shown in Figure 3. Exterior of tank 40 is a housing 41 adapted to contain a fresh supply of liquid to be congealed and connected with the housing 41 are header means 44, there being shown one header means for each unit 14. However, it is to be understood that other headers may be utilized if needed and such could be positioned in any suitable position with respect to each unit 14. Each header or distributor means 44 shown is positioned or supported within the tank 40 at the top thereof and is provided with jet-like openings 45 adapted to direct fluid over a unit 14. The units 14 may be suspended within the tank 40 by any suitable means as shown at 46 in Figure 2. A water distribution control valve, of any conventional type, is utilized to control the on or off spraying of liquid through openings 45. Numeral 47 generally represents a water feed or distribution valve, which may be of the rotary plug type and operated manually or automatically. Actually, a regulated continuous supply of fluid from openings 45 is satisfactory for successful operation, although it is preferable to control the flow of the one or more header means used with each unit so that as much liquid as possible will freeze by the time it reaches the lower part of the evaporator unit.

Directly beneath each unit 14 is a water trap device 48, which, as shown in Figure 6, slopes lengthwise of the tank and is provided with a spout 49. Numeral 51 represents an ice delivery chute extending through openings 52 in the side walls of tank 40. The bottom of tank 40 functions as a cold liquid storage means 53. Conduit means 54 connects storage means 53 through pump means 55 to housing 41. In operation, any liquid delivered from openings 45 that does not congeal to the refrigerated surfaces 17 or 17' of one of the units 14 is received in one of the traps 48 and passes to storage means 53 from whence it may be pumped by pump 55 through conduit 54 to housing 41. A float valve may be used to control the level of the liquid in storage means 53. It can be seen that by the above arrangement, the delivery chute 51 for the ice is maintained relatively dry.

A typical ice forming operation when using the embodiment shown in Figures 5 and 6 is as follows: Liquid refrigerant is admitted to the coils of the refrigerant plates of one or both units 14. Thereafter, liquid is permitted to issue from jets 45 and almost instantaneously a film of ice forms on the refrigerated surface over which the liquid from distributor 44 flows, for example, surface 17. Any liquid that does not congeal passes to trap means 48 and cold water storage means 53. After the film is of sufficient thickness, approximately $\frac{1}{4}$ to $\frac{1}{2}$ inch, to offer considerable resistance to bending, gas or other pressure means is admitted in the compartment 23 in an amount sufficient to flex the plate or surface 17 convexly to release part of the film from the surface, although no fracturing of the film usually takes place at this time. The extent to which the film is freed from the surface 17 depends upon the amount of flexing which in turn depends directly on the amount of pressure applied in compartment 23. Immediately a regulated amount of liquid from header means 44, which may issue continuously or at certain time sequences by automatic control of valve means 47, enters the freed area between the film and refrigerated surface and is substantially instantaneously congealed or bonded to the surface and film. Thereafter, pressure is removed from compartment 23 and a vacuum created therein whereupon the refrigerated surface is caused to flex concavely to free the same or another section of the film from the refrigerated surface. Alternately, flexing concavely and convexly is continued in the same manner until the strength or elastic limit of the block or film of ice composed of laminations is less than the effect of the flexing whereupon fracturing and separation takes place. The ice fractured or separated drops to a chute 51 to storage means as does any ice that breaks off prior to complete separation.

It is to be understood that one header means is arranged to apply liquid to both refrigerated surfaces of a unit 14 although operation has been described only in connection with one refrigerated surface. Also, any number of units, depending upon the size of tank 40 and the number of distributors 44, may be used at one time.

Figure 8:
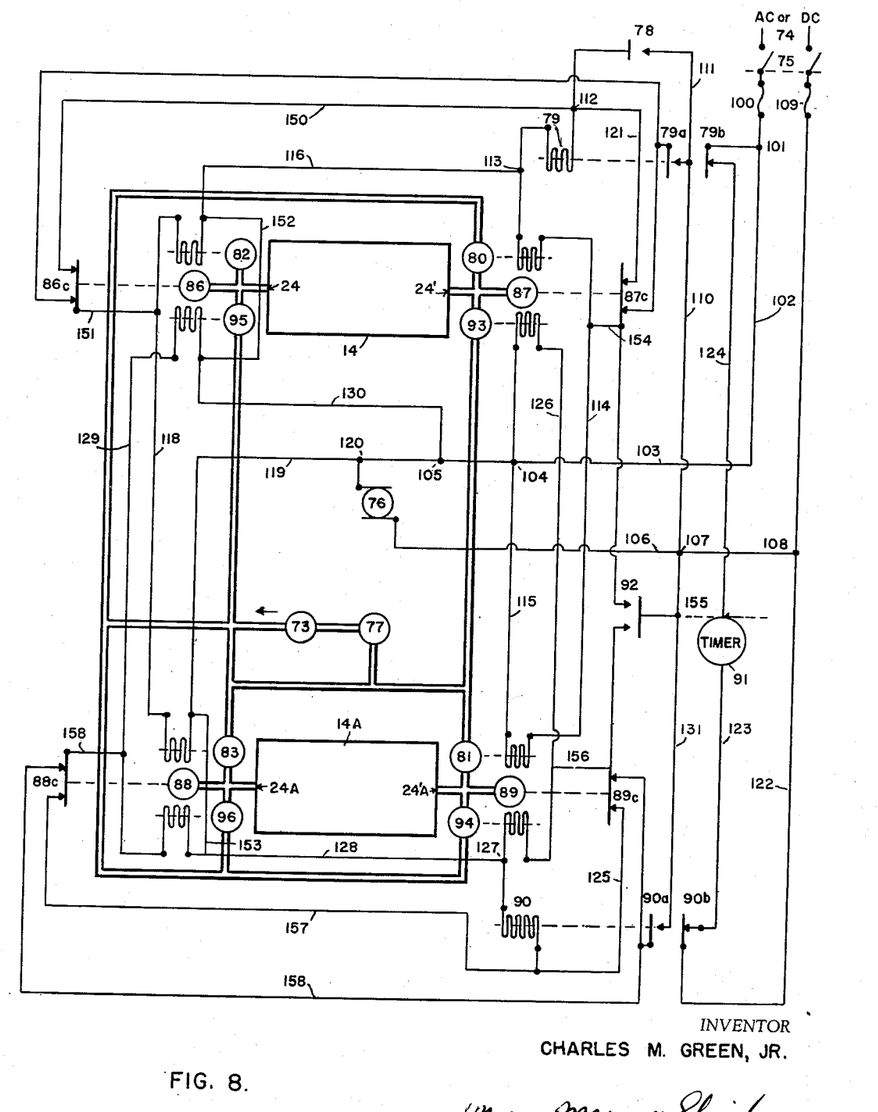
Figure 8 is a schematic diagram of the automatic timer control means for controlling the flexing of the refrigerated surfaces of both embodiments shown in the drawings.

Referring to Figure 8 of the drawing, there is shown an automatic timer control circuit for controlling the production of the ice block. While the schematic diagram illustrates controls for two units 14, it is to be understood that it is within the scope of this invention to provide a system for automatically controlling as many units as desired. Broadly speaking, by the use of timer controls, pressure responsive valves and solenoids and additional circuits, the cycle for flexing each refrigerated plate convexly and then concavely, or vice versa, may be automatically controlled and conducted in timed sequence.

As shown in Figure 8, A. C. or D. C. power, of suitable voltage, is supplied at 74, numeral 75 representing a fused safety switch and numeral 76 a motor of suitable size and power to drive gas or liquid pump 77. A reservoir of suitable capacity for the number of refrigerated surfaces employed is shown at 73 and a standard commercial timer that will mechanically close electrical switch 92 of the two-pole single-throw type is represented at 91. The time preferably is of the type that may be set to operate upon the expiration of a desired number of units of time, usually seconds, after it has been energized or placed in closed circuit. Its operation merely consists in closing of the bridging contacts 92 and when the timer is deenergized it is automatically re-set so that it will, without further supervisory act, toll out its appointed time interval before it operates after being once more energized.

Numeral 79 represents a cycling control relay having one single-pole normally open contact 79a and one single-pole normally closed contact 79b for controlling the freezing of both surfaces of refrigerated plate 14 and numerals 90, 90a and 90b represent a similar relay and associated contacts for controlling the freezing of plate 14A. Numerals 82 and 80 are solenoid control valves of conventional form, for controlling the expansion of plate 14 and 93 and 95 are solenoid control valves for controlling the contraction of plate 14, while 81 and 83 and 94 and 96 respectively are similar valves for controlling the contraction and expansion of plate 14A. Pressure operated electric switches for controlling the expansion of plate 14 are shown at 86 and 87, each having, respectively, at 86c and 87c normally closed double contacts opening on an increase in pressure. For similar use in connection with plate 14A are pressure switches 88 and 89 having normally closed contacts 88c and 89c, respectively.

It is understood that, for illustrative purposes, plates 14 and 14A are identical with those shown in Figures 1, 2 and 3, with inlet and outlet for the gas or liquid pressure into the separate compartments being shown at 24, 24', 24A and 24'A. The drawing also shows the necessary piping for the gas or liquid from the pump 77 to suction valves 95, 93, 83 and 81 and the piping for connecting the discharge of pump 77 to reservoir 73 and valves 82, 80, 96 and 94. There is shown a single-pole momentary contact switch 78 for starting the cycling of the machine and, by way of interest, it should be noted that all of the components used for automatically cycling are of standard commercial equipment.

*Operation of automatic cycling system*

It will be assumed that for the operation hereinafter described, the plates 17, 17', 17A and 17'A will not be expanded out of their normal plane but instead, to form laminated ice, gas or liquid will be evacuated from the two compartments of each plate 14 and 14A. For such an operation, pressure control switches 86, 87, 88 and 89 will be set to open their contacts at 0 to 1 pound per square inch. In this connection, for making laminated ice, 1⅜ to 1½ inches thick, the timer 91 will be set to hold the plates 17, 17', 17A and 17'A in a normal plane for fifteen seconds and in the contracted position for a like period of time.

It is assumed that the machine has been operating and that the correct amount of gas or liquid fills the refrigerated compartments 23, 23', 23A and 23'A, the piping in Figure 8 and the reservoir 73. To start operation, close switch 75 to energize motor 76 which drives pump 77 and the circuit is as follows: fuse 100 to junction point (hereafter JP) 101, wire 102, wire 103, JP104, JP105, motor 76, wire 106, JP107, JP108, back to fuse 109.

Upon closing automatic switch 78, the cycling system is started. A circuit is established through and energizes relay windings 79, 80, 81, 82 and 83, instantly upon closure of said switch 78. This circuit is traced as follows: fuse 109, JP108, JP107, wire 110, wire 111, switch 78, JP112, relay 79, JP113, relay 80, wire 114, relay 81, wire 115, JP104, wire 103, wire 102, JP101, fuse 109. Also, so as to energize relay windings 82 and 83, which are together under the independent control of contacts 86c, a circuit is established from JP112, wire 150, contact 84, wire 151, coils 82 and 83, the former back to line through jumper 152 and wire 130 and the latter back to line through wire 119.

It is to be understood that coils 82 and 83 and coils 80 and 81 are independently controlled, the former pair being under the exclusive control of contacts 86c and the latter pair being under the exclusive control of contacts 87c. If contacts 86c open, due to pressure conditions operating 86, then coils 82 and 83 are deenergized but coils 80 and 83, being not under control of 86c, remain energized until 87 operates to open contacts 87c. The reverse is, of course, true, should contacts 87c open first.

When relay winding 79 is energized, its normally open contact 79a is closed, and this establishes a holding circuit for said winding 79, traced as follows: fuse 109, JP108, JP107, wire 119, contact 79a, either of contacts 86c or 87c; if the former, back to line through wire 150, JP112, coils 79, 80 and 81; if the latter, back to line through wire 121, JP112, coils 79, 80 and 81. It is to be noted that the holding circuit will hold 79 energized as long as either of contacts 86c and 87c is closed, through one or the other of the above circuits and this means merely that switch 78 may thereafter be opened, and the circuit will continue to function, since relay 79 will not be deenergized.

Energization of relay 79 likewise open-circuits the timer 91, since normally closed contact 79b of relay 79 is opened. The timer energizing circuit was fuse 109, JP108, wire 122, normally closed contact 90b, wire 123, timer 91, wire 124, contact 79b, JP101, fuse 100. Since contact 79b is open as described, timer is de-energized and is automatically re-set, as explained above.

Now, when pressure conditions become those for which pressure switches 86 and 87 were set, 0 to 1 pound as suggested, these switches will automatically operate although not necessarily at the same time, and their bridging contacts 86c and 87c will, of course, open. Relay 79 is deenergized because bridging contacts 86c and 87c opened and the above-described holding circuit is broken, automatic switch 78 having been released. Timer 91 is now re-energized because of the re-closing of contact 79b, which establishes again the complete timer energizing circuit described above.

One of the two phases of the complete cycle has not been gone through and it is to be noted that relay 90 has never been energized.

Now the timer 91, having been energized again as above described, closes contacts 92, by bridging them. Relay 79 is now de-energized. Closing of contacts 92 energizes relay 90 and also energizes relay coils 93, 94 and 95, 96 as follows: As to relay 90, fuse 109, JP108, JP107, JP155, contacts 92, contacts 89c, wire 125, coil 90, JP127, wire 128, jumper 153 back to line via wire 119. As to coils 93 and 94: from contacts 92 across wire 156, thence to coils 93 and 94; if the former, back to line by JP104; if the latter, back to line by wire 128, jumper 153 and wire 119. As to coils 95 and 96: contacts 92, contacts 89c, wire 125, wire 157, contacts 88c, wire 159, coils 95 and 96 and back to line by obvious paths as follows: fuse 109, JP108, JP107, JP155, wire 131, contact 90a and either of contacts 89c or 88c; if the former, back to line through wire 125, relay coil 90, wire 128, jumper 153, and wire 119; if the latter, back to line via wire 158, contacts 88c, wire 157, coil 90, wire 128, jumper 153 and wire 119. It is to be noted that the holding circuit will hold 90 energized as long as either of contacts 88c and 89c is closed.

Energization of relay winding 90 likewise open-circuits the timer 91 since normally closed contact 90b of relay 90 is opened. The timer energizing circuit was discussed above, and it will be recalled that contact 90b is a necessary element of that circuit if it is to be complete. As before, the time is re-set to zero and is ready for another operation upon re-energization.

Now when pressure conditions become those for which pressure switches 88 and 89 were set, 0 to 1 pound, these switches will automatically operate in conventional manner, although not necessarily at the same time, and their bridging contacts 88c and 89c will, of course, open. Relay 90 is de-energized because bridging contacts 89c and 88c opened, and the above-described holding circuit is broken (that is, the holding circuit for coil 90). Timer 90 is now re-energized because of the re-closing of contact 90b.

This is the completion of the electrical cycle— the position at which we found ourselves at the beginning of this description of operation. The cycle will, of course, be instantly re-commenced by a momentary re-closure of switch 78, this being disclosed as automatic re-closure. The whole process of operation would be halted by opening switch 75.

It is to be understood that the above described automatic cycling control system is adapted for use in regard to expanding of the plates 17, 17', 17A and 17'A and return thereof to normal position or the expanding of the plates and passing through the normal position to the contracted position. It is believed that the operation of the system shown in Figure 8 for such use need not be explained in detail in view of the above detailed operation in connection with movement of the plates to a normal plane and to contracted position, but that it should suffice to state that the expanding action of the plates may result merely by simple adjustments of the pressure switches 86, 87, 88 and 89.

In using the automatic cycling arrangement, the thickness of the ice may be controlled by merely adjusting timer 91, it being obvious that the shorter the period of time between changing the plane of the refrigerated surfaces, the thinner the laminations of ice formed on the surfaces. For example, if it is desired to chill a liquid or other comestible the cycle would be approximately one second but, on the other hand, if it is desired to form a very thick lamination, the period of the cycle could be lengthened to two minutes and still satisfactorily release itself from the refrigerated surfaces.

Although Figure 8 does not disclose means for automatically controlling the refrigerant, if such were employed, it would be connected across switch 75. The same is true for the control circuit of a conveyor for the purpose of removing ice from the tank. The operation of the apparatus shown in Figure 8 has been described with the idea that structure similar to that shown in Figures 1 and 2 would be used but it is to be understood that the automatic cycling may readily be employed in connection with the structure shown in Figures 5 and 6.

As previously stated, refrigerated units 14 and 14A each consist, preferably, of two refrigerated plates separated from one another by a partition so as to form two separate compartments for the ingress or egress of gas or liquid pressure. Referring to unit 14 only, the same being true in connection with unit 14A, pressure control 86 is adapted to control the expansion and contraction of one compartment and pressure control 87 the expansion and contraction of the other compartment. Therefore, valves 82, 83, 92 and 93 are only in parallel when their respective pressure switches are closed. If the refrigerated surface controlled by 86 reaches its desired expansion or contraction, pressure switch 86 opens, thus closing valves 82 and 83 and still permitting pressure switch 87 to energize valve 90 and 91 until the desired expansion or contraction of the other refrigerated surface is obtained. It was determined after early experiments that no two refrigerated surfaces expanded or contracted equally under the same pressure or vacuum and, therefore, in order that each surface can be expanded or contracted equally, a separate pressure control may be incorporated so that the pressure or vacuum may be increased or decreased on each surface.

As previously stated, one of the purposes of this invention is to produce ice rapidly and more efficiently by providing prime refrigeration surface the majority of the time. By rapidly freezing water or water containing comestibles, it is possible to include in the solidification of the material being frozen a maximum percentage of the comestibles in solution. For example, the invention has been successful in freezing saltwater ice containing up to fifteen per cent salt. In the preservation of various foods, a lower temperature than that normally provided by ice is highly beneficial and desirable. Another application of this invention is chilling of liquids in chemicals without the formation of solids on the refrigerated surface. This is accomplished by changing the cycle of operation so as to release any solids formed on the refrigerated surfaces practically as fast as they are formed, in fragments or small pieces.

The phrase "lying against the refrigerated coil means" in the claims includes constructions where the coil means is attached to said walls or actually imbedded in or otherwise forms a part of said walls.

Figure 7:
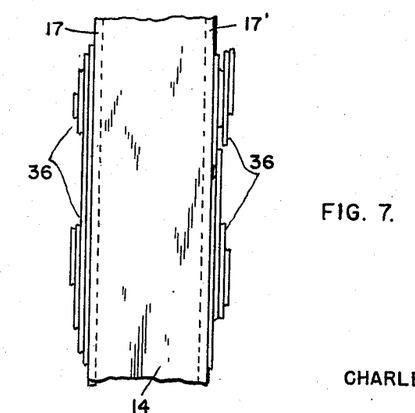
Figure 7 is a view, partly in section, showing the laminated sheet of ice formed just prior to complete release from the refrigerated surface.

It will be further appreciated that at the start of the freezing operation the wall or walls may be in any suitable position for the forming of the initial layer of ice thereon, and that subsequent layers of ice may be formed by changing in several stages, the radius of curvature of one or more of the walls. Figure 7 and the wall at the right in Figure 6, suggest for instance, that the walls have been moved to a plurality of different positions of convexity or cancavity, a layer of ice being formed after each movement is made, and before a succeeding movement begins.

It will, of course, be obvious that this application is not limited to the exact structures and methods of control and operation described herein, but is intended to serve as a disclosure of a representative few of the many ways in which my invention may be used.

For instance some embodiments of the invention may omit the partition 22 so as to provide a single space instead of spaces 23 and 23', such single space being shown in my copending application, supra, of which the present disclosure is a continuation-in-part.

Formal changes may be made in the specific embodiments of the invention described without departing from the spirit or substance of the broad invention, the scope of which is commensurate with the appended claims.

I claim:

1. That process of quick freezing ice within a container which consists in locating within said container having fluid-tight walls, a fluid-tight chamber containing therein refrigerating coil means and a pressure fluid, and having a flexible deformable wall lying against the refrigerating coil means, said coil means being in heat exchange contact with said walls during the time said walls are subjected to deformation, filling said container with a freezable liquid to a point where the liquid therein substantially covers said deformable wall, introducing a refrigerating medium through said coil means while permitting a portion of said liquid to freeze and form an ice layer on said deformable wall as it lies in heat exchange contact with said refrigerating coil means, forcing said pressure fluid into said chamber against the inside of said deformable wall until said wall presents a convex surface to said freezable liquid while in heat exchange relation to said coil means, removing pressure from said wall until it presents a concave surface to said freezable liquid while in heat exchange relation with said coil means until said ice layer becomes partially detached from said wall, permitting the formation of a fresh layer of ice on said deformable wall to form an additional lamination on said first ice layer between the first ice layer and the deformable wall, again forcing said pressure fluid into said chamber and against said deformable wall until fractionation again occurs, and continuing the operation by alternately flexing said wall in one direction and then the other to cause laminated ice layers to be released from said deformable wall and float to the surface of the freezable liquid, and removing the same therefrom.

2. That process of quick freezing ice within a container which consists in locating within said container having fluid-tight walls, a fluid-tight chamber containing therein refrigerating coil means and a pressure fluid, and having oppositely located flexible walls lying against the refrigerating coils means, said coil means being in heat exchange contact with said walls during the time said walls are subjected to deformation, filling said container with a freezable liquid to a point where the liquid therein substantially covers said flexible walls, introducing a refrigerating medium through said coil means while permitting a portion of said liquid to freeze and form an ice layer on said flexible walls as they lie in heat exchange contact with said refrigerating coil means, forcing said pressure fluid into said chamber against the inside of said flexible walls, until said walls present convex surfaces to said freezable liquid while in heat exchange relation to said coil means, removing pressure from said walls until they present concave surfaces to said freezable liquid while in heat exchange relation with said coil means until said ice layer becomes partially detached from said walls, permitting the formation of a fresh layer of ice on said flexible walls to form an additional lamination on said first ice layer between the first ice layer and the flexible walls, and again forcing said pressure fluid into said chamber and against said flexible walls until fractionation again occurs, and continuing the operation by alternately flexing said walls in one direction and then the other to cause laminated ice layers to be released from said flexible walls and float to the surface of the freezable liquid, and removing the same therefrom.

3. That process of quick freezing ice within a container which consists in locating within said container having fluid-tight walls, a plurality of fluid-tight chambers having substantially parallel walls each containing therein refrigerating coil means and a pressure fluid and having oppositely located flexible walls lying against the refrigerating coil means, said coil means being in heat exchange contact with said walls during the time said walls are subjected to deformation, filling said container with a freezable liquid to a point where the liquid therein substantially covers said flexible walls, introducing a refrigerating medium through said coil means while permitting a portion of said liquid to freeze and form an ice layer on said flexible walls as they lie in heat exchange contact with said refrigerating coil means, forcing said pressure fluid into said chambers against the inside of said flexible walls until said walls present convex surfaces to said freezable liquid while in heat exchange relation to said coil means, removing pressure from said walls until they present concave surfaces to said freezable liquid while in heat exchange relation with said coil means until said ice layer becomes partially detached from said walls, permitting the formation of a fresh layer of ice on said flexible walls to form an additional lamination on said first ice layer between the first ice layer and the flexible walls and again forcing said pressure fluid into said chambers and against said flexible walls until fractionation again occurs, and continuing the operation by alternately flexing said walls in one direction and then the other to cause laminated ice layers to be released from said flexible walls and float to the surface of the freezable liquid, and removing the same therefrom.

4. That process of quick freezing ice within a container which consists in locating within said container having fluid-tight walls, a plurality of fluid-tight chambers having substantially parallel walls each containing therein refrigerating coil means and a pressure fluid, and having oppositely located flexible walls lying against the refrigerating coil means with the juxtaposed walls of each chamber being inclined to each other, said coil means being in heat exchange contact with said walls during the time said walls are subjected to deformation, filling said container with a freezable liquid to a point where the liquid therein substantially covers said flexible walls, introducing a refrigerating medium through said coil means while permitting a portion of said liquid to freeze and form an ice layer on said flexible walls as they lie in heat exchange contact with said refrigerating coil means, forcing said pressure fluid into said chambers against the inside of said flexible walls until said walls present convex surfaces to said freezable liquid while in heat exchange relation to said coil means, removing pressure from said walls until they present concave surfaces to said freezable liquid while in heat exchange relation with said coil means until said ice layer becomes partially detached from said walls, permitting the formation of a fresh layer of ice on said flexible walls to form an additional lamination on said first ice layer between the first ice layer and the flexible walls, and again forcing said pressure fluid into said chamber and against said flexible walls until fractionation again occurs, and continuing the operation in timed relationship, and removing the ice fragments which float to the top of the freezable liquid.

5. In an ice making apparatus, a liquid-tight container, a fluid-tight chamber mounted in said container having at least one flexible deformable wall, a refrigerating coil means within said chamber and attached to and movable with said flexible deformable wall whereby said coil means continuously remains in heat exchange relationship with said deformable wall during the time said wall is subjected to deformation, said chamber being located at a point in said container whereby said deformable wall may be covered by a freezable liquid within said container, means for filling said container with a freezable liquid to a point where the liquid covers said deformable wall and means for introducing refrigerating medium through said coil means while the same is in contact with said deformable wall, means for forcing a pressure fluid into said chamber whereby to cause said wall to expand and to assume a convex surface to said freezable liquid and to partially fractionate the ice layer on said deformable walls, and means for removing pressure from said deformable wall until it assumes a position where it presents a concave surface to said freezable liquid while still in heat exchange relation with said coil means whereby to permit the formation of a fresh layer of ice on said deformable wall, whereby said deformable wall may again be deformed to continue the fractionation operation, until the laminated layer of ice becomes detached from said flexible walls and floats to the surface of the freezable liquid and means for removing said laminated ice from the surface of said freezable liquid.

6. In an ice making apparatus, a liquid-tight container, a plurality of fluid-tight chambers mounted in said container having flexible deformable walls, a refrigerating coil means within said chambers and attached to and movable with said flexible deformable walls whereby said coil means continuously remains in heat exchange relationship, said chambers being located at a point in said container whereby said deformable walls may be covered by a freezable liquid within said container, means for filling said container with a freezable liquid to a point where the liquid covers said deformable walls and means for introducing refrigerating medium through said coil means while the same is in contact with said deformable walls, means for forcing a pressure fluid into said chambers whereby to cause said walls to expand and to assume a convex surface to said freezable liquid and to partially fractionate the ice layer on said deformable walls, and means for removing pressure from said deformable walls until they assume a position where it presents a concave surface to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid.

7. In an ice making apparatus, a liquid-tight container, a plurality of fluid-tight chambers mounted in said container having parallel flexible deformable walls, a refrigerating coil means within said chambers and against which said flexible deformable walls normally lie in heat exchange relationship, said coil means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls, and means for introducing refrigerating medium through said coil means while the same is in contact with the said deformable walls, means for forcing a pressure fluid into said chambers whereby to cause said walls to expand and assume a convex surface to said freezable liquid and to partially fractionate the ice layer on said deformable walls and means for removing pressure from said deformable walls until they assume a position where they present concave surfaces to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and continuing the operation in timed cycles, and means for removing said laminated ice from the surface of said freezable liquid.

8. In an ice making apparatus, a liquid-tight container, a plurality of fluid-tight chambers mounted in said container each having parallel flexible deformable walls each of said chambers having a rigid dividing plate which separates each chamber into a plurality of fluid-tight compartments; a refrigerating coil means within said chamber and against which said flexible deformable walls lie in heat exchange relationship, said coil means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls, and means for introducing a refrigerating medium through said coil means while the same is in contact with said deformable walls, means for forcing a pressure fluid into said chambers whereby to cause said walls to expand and to assume a convex surface to said freezable liquid and to partially fractionate the ice layer on said deformable walls, and means for removing pressure from said deformable walls until they assume a position where they present concave surfaces to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid.

9. In an ice making apparatus, a liquid-tight container, a fluidtight chamber mounted in said container having at least one flexible deformable wall, a refrigerating coil means within said chamber and attached to and movable with said flexible deformable wall whereby said coil means continuously remains in heat exchange relationship, said coil means being in heat exchange contact with said walls during the time said walls are subjected to deformation, said chamber being located at a point in said container whereby said deformable wall may be covered by a freezable liquid within said container, means for filling said container with a freezable liquid to a point where the liquid covers said deformable wall, and means for introducing refrigerating medium through said coil means while the same is in contact with said deformable wall, means for forcing a pressure fluid into said chamber whereby to cause said wall to expand and to assume a convex surface to said freezable liquid and to partially fractionate the ice layer on said deformable walls, and means for removing pressure from said deformable wall until it assumes a position where it presents a concave surface to said freezable liquid while still in heat exchange relation with said coil means whereby to permit the formation of a fresh layer of ice on said deformable wall, whereby said deformable wall may again be deformed to continue the fractionation operation, until the laminated layer of ice becomes detached from said flexible walls and floats to the surface of the freezable liquid and means for removing said laminated ice from the surface of said freezable liquid, and timed control means for automatically flexing said wall in one direction and the other in timed sequence.

10. In an ice making apparatus, a liquid-tight container, a plurality of fluid-tight chambers mounted in said container having flexible deformable walls, a refrigerating coil means within said chambers and attached to and movable with said flexible deformable walls whereby said coil said means continuously remains in heat exchange relationship, said coil means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls and means for introducing refrigerating medium through said coil means while the same is in contact with said deformable walls, means for forcing a pressure fluid into said chambers whereby to cause said walls to expand and to assume a convex surface to said freezable liquid and to partially fractionate the ice layer on said deformable walls, and means for removing pressure from said deformable walls until they assume a position where it presents a concave surface to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of said freezable liquid, and timed control means for automatically flexing said surface in one direction and the other in timed sequence.

11. In an ice making apparatus, a liquid-tight container, a plurality of fluid-tight chambers mounted in said container having parallel flexible deformable walls, a refrigerating coil means within said chambers and against which said flexible deformable walls normally lie in heat exchange relationship, said coil means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls, and means for introducing refrigerating medium through said coil means while the same is in contact with said deformable walls, means for forcing a pressure fluid into said chambers whereby to cause said walls to expand and to assume a convex surface to said freezable liquid and to partially fractionate the ice layer on said deformable walls, and means for removing pressure from said deformable walls until they assume a position where they present concave surfaces to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid, and timed control means for automatically flexing said surface in one direction and the other in timed sequence.

12. In an ice making apparatus, a liquid-tight container, a plurality of fluid-tight chambers mounted in said container having flexible deformable walls, a refrigerating coil means within said chambers and attached to and movable with said flexible deformable walls whereby said coil means continuously remains in heat exchange relationship, said coil means being in heat exchange contact with said walls during the time said walls are subjected to deformation, said chambers being located at a point in said container whereby said deformable walls may be covered by a freezable liquid within said container, means filling said container with a freezable liquid to a point where the liquid covers said deformable walls and means for introducing refrigerating medium through said coil means while the same is in contact with said deformable walls, means for forcing a pressure fluid into said chambers whereby to cause said walls to expand and to assume a convex surface to said freezable liquid and to partially fractionate the ice layer on said deformable walls, and means for removing pressure from said deformable walls until they assume a position where it presents a concave surface to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid, each of said chambers having a wall means dividing same into a plurality of compartments.

13. In an ice making apparatus, a liquid-tight container, a plurality of fluid-tight chambers mounted in said container having parallel flexible deformable walls, a refrigerating coil means within said chambers and against which said flexible deformable walls normally lie in heat exchange relationship, said coil means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls, and means for introducing refrigerating medium through said coil means while the same is in contact with the said deformable walls, means for forcing a pressure fluid into said chambers whereby to cause said walls to expand and to assume a convex surface to said freezable liquid and to partially fractionate the ice layer on said deformable walls and means for removing pressure from said deformable walls until they assume a position where they present concave surfaces to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid, each of said chambers having a wall means dividing same into a plurality of compartments, and means for continuing the operation in timed relationship.

14. In an ice making apparatus, a liquid-tight container, a plurality of fluid-tight chambers mounted in said container each having parallel flexible deformable walls forming an angle with each other, a refrigerating coil means within said chambers and against which said flexible deformable walls normally lie in heat exchange relationship, said coil means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls, and means for introducing a refrigerating medium through said coil means while the same is in contact with said deformable walls, means for forcing a pressure fluid into said chambers whereby to cause said walls to expand and to assume a convex surface to said freezable liquid and to partially fractionate the ice layer on said deformable walls, and means for removing pressure from said deformable walls until they assume a position where they present concave surfaces to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid, each of said chambers having a wall means dividing same into a plurality of compartments.

15. In an ice making apparatus, a liquid-tight container, a plurality of fluid-tight chambers mounted in said container, each having a portion forming a pair of compartments having flexible deformable walls, a refrigerating coil means within said compartments and attached to and movable with said flexible deformable walls whereby said coil means continuously remains in heat exchange relationship, said coil means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls and means for introducing refrigerating medium through said coil means while the same is in contact with said deformable walls, means for forcing a pressure fluid into said compartments whereby to cause said walls to expand and to assume a convex surface to said freezable liquid and to partially fractionate the ice layer on said deformable walls, and means for removing pressure from said deformable walls until they assume a position where it presents a concave surface to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid.

16. In an ice making apparatus, a liquid-tight container, a plurality of fluid-tight chambers mounted in said container each having a portion forming a pair of compartments having flexible deformable walls, a refrigerating coil means within said compartments and against which said flexible deformable walls normally lie in heat exchange relationship, said coils means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls, and means for introducing refrigerating medium through said coil means while the same is in contact with the said deformable walls, means for forcing pressure fluid into said compartments whereby to cause said walls to expand and to assume a convex surface to said freezable liquid and to partially fractionate the ice layer on said deformable walls, and means for removing pressure from said deformable walls until they assume a position where they present concave surfaces to said freezable liquid while still in heat exchange relation with said coil means whereby to permit the formation of an additional layer of ice on said first layer and said deformable walls, whereby said deformable walls may again be deformed to continue the fractionation operation until the laminated layer of ice becomes detached from said flexible walls and floats to the surface of the freezable liquid and continuing the operation in timed cycles, and means for removing said laminated ice from the surface of said freezable liquid.

17. In an ice making apparatus, a liquid-tight container, a plurality of fluid-tight chambers mounted in said container each having a portion forming a pair of compartments each having parallel flexible deformable walls forming an angle with each other, a refrigerating coil means within said compartments and against which said flexible deformable walls normally lie in heat exchange relationship, said coils means being in heat exchange contact with said walls during the time said walls are subjected to deformation, said chambers being located at a point in said container whereby said deformable walls may be covered by a freezable liquid within said container, means for filling said container with a freezable liquid to a point where the liquid covers said deformable walls, and means for introducing a refrigerating medium through said coil means while the same is in contact with said deformable walls, means for forcing a pressure fluid into said compartments whereby to cause said walls to expand and to assume a convex surface to said freezable liquid and to partially fractionate the ice layer on said deformable walls, and means for removing pressure from said deformable walls until they assume a position where they present concave surfaces to said freezable liquid while still in heat exchange relation with said coil means whereby to permit the formation of an additional layer of ice on said first layer and said deformable walls, whereby said deformable walls may again be deformed to continue the fractionation operation, until the laminated layer of ice becomes detached from said flexible walls and floats to the surface of the freezable liquid and means for removing said laminated ice from the surface of said freezable liquid.

18. That process of quick freezing ice within a container which consists in locating within said container having fluidtight walls, a fluidtight chamber containing therein refrigerating coil means and a pressure fluid, and having a flexible deformable wall lying against and being in heat exchange contact with said deformable wall during the time said wall is subjected to deformation, filling said container with a freezable liquid to a point where the freezable liquid substantially covers said deformable wall, introducing a refrigerating medium through said coil means while permitting a portion of said liquid to freeze and form a layer of ice on said deformable wall, causing said deformable wall to be distorted by introduction or withdrawal of said pressure fluid to or from said chamber against the inside of said deformable wall until said ice layer partially breaks away from said fluidtight chamber, allowing said freezable liquid to find its way between said deformable wall and the ice layer to cause a second ice layer to be formed, continuing the process until the laminated ice layer is released from the deformable wall and floats to the surface of the freezable liquid.

19. That process of quick freezing ice within a container which consists in locating within said container having fluidtight walls, a fluidtight chamber containing therein refrigerating coil means and a pressure fluid, and having flexible deformable walls lying against and being in heat exchange contact with said deformable walls during the time said walls are subjected to deformation, filling said container with a freezable liquid to a point where the freezable liquid substantially covers said deformable walls, introducing a refrigerating medium through said coil means while permitting a portion of said liquid to freeze and form a layer of ice on said deformable walls, causing said deformable walls to be distorted by introduction or withdrawal of said pressure fluid to or from said chamber against the inside of said deformable walls until said ice layer partially breaks away from said fluid tight chamber, allowing said freezable liquid to find its way between said deformable walls and the ice layer to cause a second ice layer to be formed, continuing the process until the laminated ice layer is released from the deformable walls and floats to the surface of the freezable liquid.

20. In an ice making apparatus, a liquid tight container, a fluidtight chamber mounted in said container having at least one flexible deformable wall, a refrigerating coil means within said chamber, said coil means being in heat exchange contact with said wall during the time said wall is subjected to deformation, said chamber being located at a point in said container whereby said deformable wall may be covered by a freezable liquid within said container, means for filling the container with a freezable liquid to a point where the liquid covers said deformable wall, means for introducing a refrigerating medium through said coil means while the same is in heat exchange contact with said deformable wall, means for forcing or withdrawing a pressure fluid into or out of said chamber whereby to cause said wall to become deformed until an ice layer formed on said deformable wall becomes partially detached therefrom and freezable liquid enters the space between said ice layer and said deformable wall to form a second ice layer lamination, means for again changing the pressure exerted by said pressure fluid against said deformable wall to further deform said wall until the laminated layer of ice becomes detached from said deformable wall and floats to the surface of the freezable liquid, and means for removing the laminated ice from the surface of the freezable liquid.

21. In an ice making apparatus, a liquid tight container, a fluidtight chamber mounted in said container having at least one flexible deformable wall, a refrigerating coil means within said chamber, said coil means being in heat exchange contact with said walls during the time said walls are subjected to deformation, said chamber being located at a point in said container whereby said deformable wall may be covered by a freezable liquid within said container, means for filling the container with a freezable liquid to a point where the liquid covers said deformable wall, means for introducing a refrigerating medium through said coil means while the same is in heat exchange contact with said deformable wall, means for forcing or withdrawing a pressure fluid into or out of said chamber whereby to cause said wall to become deformed until an ice layer formed on said deformable wall becomes partially detached therefrom and freezable liquid enters the space between said ice layer and said deformable wall to form a second ice layer lamination, means for again changing the pressure exerted by said pressure fluid against said deformable wall to further deform said wall until the laminated layer of ice becomes detached from said deformable wall and floats to the surface of the freezable liquid, and means for removing the laminated ice from the surface of the freezable liquid, and means for causing said wall deformations in timed relationship.

22. In an ice making apparatus, a liquid tight container, a plurality of fluidtight chambers mounted in said container having at least one flexible deformable wall, a refrigerating coil means within said chambers, said coil means being in heat exchange contact with said walls during the time said walls are subjected to deformation, said chambers being located at a point in said container whereby said deformable walls may be covered by a freezable liquid within said container, means for filling the container with a freezable liquid to a point where the liquid covers said deformable walls, means for introducing a refrigerating medium through said coil means while the same is in heat exchange contact with said deformable walls, means for forcing or withdrawing a pressure fluid into or out of said chambers whereby to cause said walls to become deformed until an ice layer formed on said deformable walls becomes partially detached therefrom and freezable liquid enters the space between said ice layer and said deformable walls to form a second ice layer lamination, means for again changing the pressure exerted by said pressure fluid against said deformable walls to further deform said walls until the laminated layer of ice becomes detached from said deformable walls and floats to the surface of the freezable liquid, and means for removing the laminated ice from the surface of the freezable liquid.

References Cited in the file of this patent

UNITED STATES PATENTS

| Number | Name | Date |
|---|---|---|
| 1,451,901 | Field | Apr. 17, 1923 |
| 1,482,227 | Field | Jan. 29, 1924 |
| 1,923,522 | Whitehouse | Aug. 22, 1933 |
| 2,334,941 | Linden | Nov. 23, 1943 |
| 2,542,891 | Bayston | Feb. 20, 1951 |
| 2,571,506 | Watt | Oct. 16, 1951 |
| 2,613,511 | Walsh | Oct. 14, 1952 |